United States Patent [19]
Yoshioka et al.

[11] Patent Number: 4,566,810
[45] Date of Patent: Jan. 28, 1986

[54] STEAM TURBINE ROTOR SHAFT

[75] Inventors: Takatoshi Yoshioka; Seishin Kirihara; Masao Shiga; Katsumi Iijima; Katsukuni Hisano; Ryoichi Kaneko, all of Hitachi, Japan

[73] Assignee: Hitachi, Ltd., Tokyo, Japan

[21] Appl. No.: 484,204

[22] Filed: Apr. 12, 1983

[30] Foreign Application Priority Data

Apr. 14, 1982 [JP] Japan ................................ 57-61009

[51] Int. Cl.4 ..................... F16C 33/04; F16C 33/08; F16C 33/14
[52] U.S. Cl. .................................. 384/280; 384/276; 384/295; 384/912
[58] Field of Search ............... 384/276, 280, 287, 290, 384/295, 912; 308/DIG. 15

[56] References Cited
U.S. PATENT DOCUMENTS 4,426,162  1/1984  Tsuchiya et al. ............... 384/295 X

FOREIGN PATENT DOCUMENTS 16744  5/1980  Japan .
83718  5/1982  Japan ................................... 384/276

Primary Examiner—Donald Watkins
Assistant Examiner—Thomas R. Hannon
Attorney, Agent, or Firm—Antonelli, Terry & Wands

[57] ABSTRACT

A steam turbine rotor shaft made of precipitation-hardened forged austenite steel, comprising first, second and succeeding layers of build-up welding provided on an outer surface of a bearing portion of a journal section in the rotor shaft, the first layer being provided by use of a welding rod of Ni base alloy, the second and succeeding layers being provided by use of a welding rod of low alloy steel which layers have better bearing characteristics than those of the austenite steel.

2 Claims, 7 Drawing Figures

FIG. I
PRIOR ART
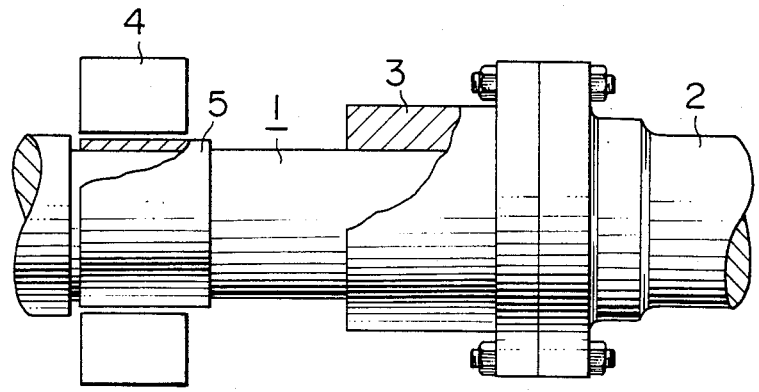
FIG. 2
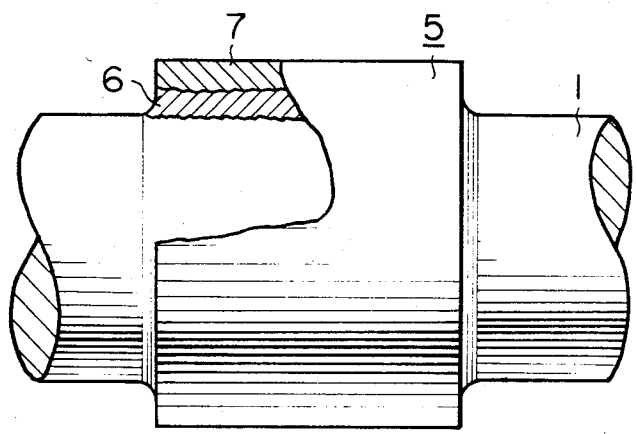

STEAM TURBINE ROTOR SHAFT

BACKGROUND AND SUMMARY OF THE INVENTION

This invention relates to steam turbine rotors, and more particularly it is concerned with a novel steam turbine rotor shaft made of high chromium and high nickel austenite steel having at the journal section thereof a plurality of layers of build-up welding that have high strength and excellent bearing characteristics.

To cope with the situation of shortage of oil and its high prices, a generating station has a tendency to be operated at high temperature under high pressure so as to improve the operation efficiency thereof. Nowadays steam turbine rotors operate under the steam condition of 538° C., and Cr-Mo-V steel and 12% Cr base steel constitute the main body of the steam turbine rotors. However, these materials can not be used under the high temperature condition of over 600° C. and high pressure because they are insufficient for high temperature strength and are low in resistance to oxidation at such high temperature.

Meanwhile high Cr and high Ni austenite stainless steel has an excellent high temperature creep rupture characteristic and is highly resistant to oxidation at high temperature, so that this stainless steel is suitable for use as materials for fabricating steam turbine rotors capable of operating under high temperature and pressure.

FIG. 1 of the drawings shows a conventional improved construction of a journal section of a rotor shaft made of 12% Cr steel. The rotor shaft has at one end portion of a rotor 1 a coupling 3 fitted thereon by shrink fit for coupling the rotor 1 to a shaft 2 of a generator. However, it is considered best that the coupling be formed integrally with the rotor shaft.

Japanese Patent Laid-Open Publication No. 16744/80 discloses a construction of the journal section of a rotor shaft in which, in order to improve such inferior bearing characteristic, there is provided a layer 5 formed by build-up welding by use of an electrode containing about 0.1% Cr.

The inventors have found that the high Cr and high Ni austenite stainless steel used for producing the rotor shaft capable of being operated at higher temperature is inferior in bearing characteristics with such a drawback being caused that a bearing 4 is apt to be injured at a journal portion 5 made of the high Cr and high Ni stainless steel.

The inventors have also found that it is impossible to improve the bearing characteristics of rotor shafts made of high Cr and high Ni austenite steel even if there is merely effected such build-up welding as described in the prior art with regard to the conventional rotor shaft made of 12% Cr steel. When build-up welding is effected, it is necessary to subject the rotor shaft to heat treatment at a high temperature of about 1000° C. to reduce residual stress in the heat-affected zone of the austenite steel and render uniform the structure and hardness. In the example described hereinabove of effecting build-up welding by using an electrode containing about 0.1% Cr, however, a reduction in strength of the build-up welding portion would result if the rotor shaft is subjected to heat treatment at such high temperature. If welding rod of low Cr content is used for effecting build-up welding in a rotor shaft made of high Cr steel and then the rotor shaft is subjected to heat treatment at a high temperature of about 1000° C., the ductility of deposited metal would be inordinately reduced in the first and second layers thereof and cracks are apt to be caused therein while in service, thereby causing rupture of the rotor in the worst cases.

The object of the present invention is to obtain a steam turbine rotor shaft made of precipitation-hardened austenite steel in which shaft there is provided a journal section superior in bearing characteristics.

According to the invention, there is provided a steam turbine rotor shaft formed of forged austenite steel that is subjected to precipitation hardening, wherein the rotor shaft comprises a metal member having bearing characteristics superior to those of such forged austenite steel, which metal member is provided on an outer surface of a bearing portion in a journal section thereof.

The outer surface part in the bearing portion of the journal section of the rotor shaft is preferably formed of a material containing Fe as its principal constituent and Cr in 0.3–3.0 wt %. Particularly, the metal forming the outer surface part of the bearing portion preferably consists essentially of not more than 0.1% C, not more than 1.0% Si, not more than 2.0% Mn, 0.3–3.0% Cr, not more than 2.0% Mo and the balance substantially Fe. More specifically, the metal preferably consists essentially of 0.04–0.08% C, 0.1–0.5 Si, 0.3–1.0% Mn, 0.5–1.0% Cr, 0.3–1.0% Mo and the balance substantially Fe.

When the metal member is provided by build-up welding, a surface portion in the layers of build-up welding may preferably be of tempered martensite structure predominantly while having carbides precipitated therein.

The austenite steel of high Cr and high Ni contents forming a main body of the steam turbine rotor shaft according to the present invention has a $\partial'$ phase and consists essentially, by weight, of 0.01–0.1% C, not more than 1.0% Si, not more than 2.0% Mn, 12–16% Cr, 24–27% Ni, 0.5–1.5% Mo, 1.0–2.5% Ti, 0.2–0.4% Al, 0.1–0.4% V and the balance substantially Fe. More preferably, the austenite steel further includes 0.003–0.008% B by weight. Preferably the steel according to the invention may be softened by quenching after being held at 900–1100° C. and then may be precipitation-hardened because of Ni compounds and carbides by being slowly cooled after being held at a temperature in the range between 650° and 750° C.

Before effecting welding, it is necessary to soften the steel according to the present invention by subjecting the steel to heat treatment in which the steel is quenched after being held at a temperature in the range between 900° and 1100° C. If welding is performed directly after precipitation hardening has been effected, there is a possibility that weld crack might occur due to embrittlement of the welding heat-affected zone.

BRIEF DESCRIPTION OF THE DRAWINGS

The invention, along with its objects and advantages, will be best understood from consideration of the following detailed description in conjunction with the accompanying drawings in which:

FIG. 1 is a front view of a journal portion of and a coupling in a conventional steam turbine rotor shaft the parts of which journal portion and coupling are broken away;

FIG. 2 is a front view of a journal portion in a steam turbine rotor shaft embodying the present invention a part of which journal portion is broken away, the rotor shaft being provided on the journal portion thereof with layers of build-up welding;

DESCRIPTION OF THE PREFERRED EMBODIMENT

Figure 3:
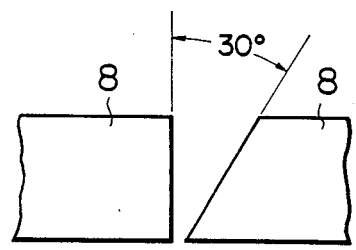
FIGS. 3 and 4 are sectional views each showing the groove of welding.

FIG. 2 schematically shows layers provided by build-up welding according to the invention. As shown, the layers of build-up welding provided according to the invention are of two layers 6 and 7 prepared by using two kinds of welding rods each having different principal components.

The welding rod used for providing the first layer 6 of build-up welding is preferably of a nickel base alloy which, when strength is of prime importance, preferably has the composition consisting essentially, by weight, of 0.01–0.1% C., 0.5–3.5% Mn, 0.2–1.0% Si, 0.2–1.0% Cu, 60–75% Ni, 0.2–1.0% Al, 1.5–3.0% Ti, 10–20% Cr, 0.5–1.5% Nb and the balance substantially Fe. The first layer 6 of build-up welding should have a thickness large enough to prevent heat generated in succeeding welding from exerting bad influence upon the boundary between the deposited metal of the root pass and the base metal. Thus the first layer 6 of build-up welding performed by using the Ni base welding rod may be of two or more beads.

According to the invention, the first layer 6 of build-up welding is provided by using the Ni base alloy welding rod, and then the second layer 7 of build-up welding is provided by using a low alloy steel welding rod containing 0.3–3.0% Cr as described hereinabove. The last build-up welding portion provided at the last stage of the welding is preferably subjected to stress-relief annealing at a temperature in the range between 550° and 680° C.

However, it is impossible to effect relief of residual stress caused in the heat-affected zone of the rotor shaft in the case where the aforesaid stress-relief annealing is performed at a relatively low temperature. To eliminate or reduce this problem, in the present invention, it is preferred to effect the heat treatment of the weld zone by holding it at a high temperature in the range between 900° and 1100° C. after the root pass of build-up welding regarding first layer 6 is provided by using the Ni base alloy welding rod, and then the heat-treated weld zone is quenched.

By holding the weld zone at the high temperature as described hereinabove, it becomes possible to essentially relieve most of the residual stress in the welding heat-affected zone of the rotor shaft.

When the welding rod of low Cr steel is used for providing the first layer 6 of build-up welding, there is a possibility that the strength of the weld zone of the build-up welding decreases and the boundary between the deposited metal and the base metal becomes brittle even if residual stress is relieved by holding at a high temperature between 900° and 1100° C. Thus, in this case, it becomes necessary to further provide means for avoiding this problem. However, when the welding rod of Ni base alloy is used for providing the first layer 6 of build-up welding according to the invention, the build-up welding portion is stable at high temperatures, so that no problems are caused like these which can occur with the use of low Cr steel as described above. According to the invention, it is more preferable that the build-up welding portion be quenched following holding at 900°–1100° C. after the first layer 6 is provided, then be held at 650°–750° C. and be gradually cooled after the holding.

According to the invention, build-up welding is performed by using a welding rod containing, by weight, 0.3–3.0% Cr to provide the following layers up to the last layer after the first layer is provided. Then, the build-up welding portions are subjected to the stress-relief treatment at a temperature in the range between 550° and 650° C. If the temperature at which stress-relief heat treatment is performed is higher than the aforesaid level, the rotor body would suffer the influence of over-aging and its fatigue strength would be greatly reduced.

The journal section will be heated to a substantially high temperature by friction. To obtain a journal section having superior resistence to oxidation, high strength at high temperature and high wear resistance at high temperature, it is preferred that the Cr content in the welding rod used be not less than 0.3% by weight. To prevent a reduction in bearing characteristics from being caused by the formation of carbides, the welding rod used preferably contains not more than 3.0% by weight of Cr. Particularly, the range of 0.5 and 2.0% Cr is preferred.

In carrying out build-up welding, the values of preheating temperature and interpass temperatures are preferably not more than 200° C. for the first layer and are between 100° and 250° C. for the second layer.

EXAMPLE 1

A base material prepared for experiments to ascertain the effects of the present invention had the chemical compositions shown in Table 1 (weight percent).

TABLE 1

| C | Si | Mn | Cr | Ni | Mo | V | Ti | B | Al | Fe |
|---|---|---|---|---|---|---|---|---|---|---|
| 0.014 | 0.44 | 1.41 | 15.05 | 25.56 | 1.37 | 0.31 | 2.17 | 0.004 | 0.30 | Bal. |

The configuration of the base material was a plate having a thickness of 72 mm, a width of 135 mm and a length of 200 mm. FIG. 3 shows a V-shaped groove with an angle of 30 degrees at one side thereof.

Table 2 shows the chemical compositions (weight percents) of the welding rod used.

No. A shows the chemical compositions of the deposited metal provided by a TIG welding wire (diameter, 1.6 mm) used for providing a first layer of build-up welding of Ni base alloy according to the invention.

No. B shows the chemical compositions of the deposited metal provided by a shielded metal arc welding rod (diameter, 3.2 mm) used for providing a second layer according to the invention.

No. C shows the chemical composition of the deposited metal of low Cr steel of a shielded metal arc welding rod (diameter, 3.2 mm) used for comparison with No. B.

TABLE 2

| No. | C | Si | Mn | Cu | Ni | Cr | Co | Ti | Nb | Mo |
|---|---|---|---|---|---|---|---|---|---|---|
| A | 0.07 | 0.41 | 1.0 | 0.3 | 71.3 | 16.5 | 0.003 | 2.16 | 0.05 | — |
| B | 0.03 | 0.70 | 0.90 | 0.015 | 0.03 | 1.30 | — | — | — | 0.57 |

TABLE 2-continued

| No. | C | Si | Mn | Cu | Ni | Cr | Co | Ti | Nb | Mo |
|-----|------|------|------|-------|----|------|----|----|----|------|
| C | 0.06 | 0.18 | 0.50 | 0.015 | —  | 0.47 | —  | —  | —  | 0.47 |

Figure 4:
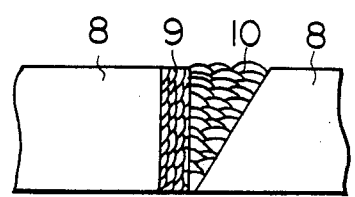

FIG. 4 shows the weld zone in cross section. In performing welding, a downhand welding was first performed to form a deposited metal 9 of build-up welding, and then butt welding was performed. In the drawing, the butt welding is performed to obtain specimens of the joint to be tested regarding the strength of the deposited metal of the build-up welding.

Table 3 shows the welding rods used for performing the build-up welding 9. The welding rods shown in Table 3 had the chemical compositions shown in Table 2.

The deposited metal had a thickness of about 6–8 mm for the first layer and about 8–9 mm for the second layer. The welding rod used for performing butt welding 10 was No. B.

TABLE 3

|     | Types of Electrodes |              |
|-----|---------------------|--------------|
| No. | First Layer         | Second Layer |
| 1   | A                   | B            |
| 2   | C                   | C            |
| 3   | A                   | B            |

Figure 6:
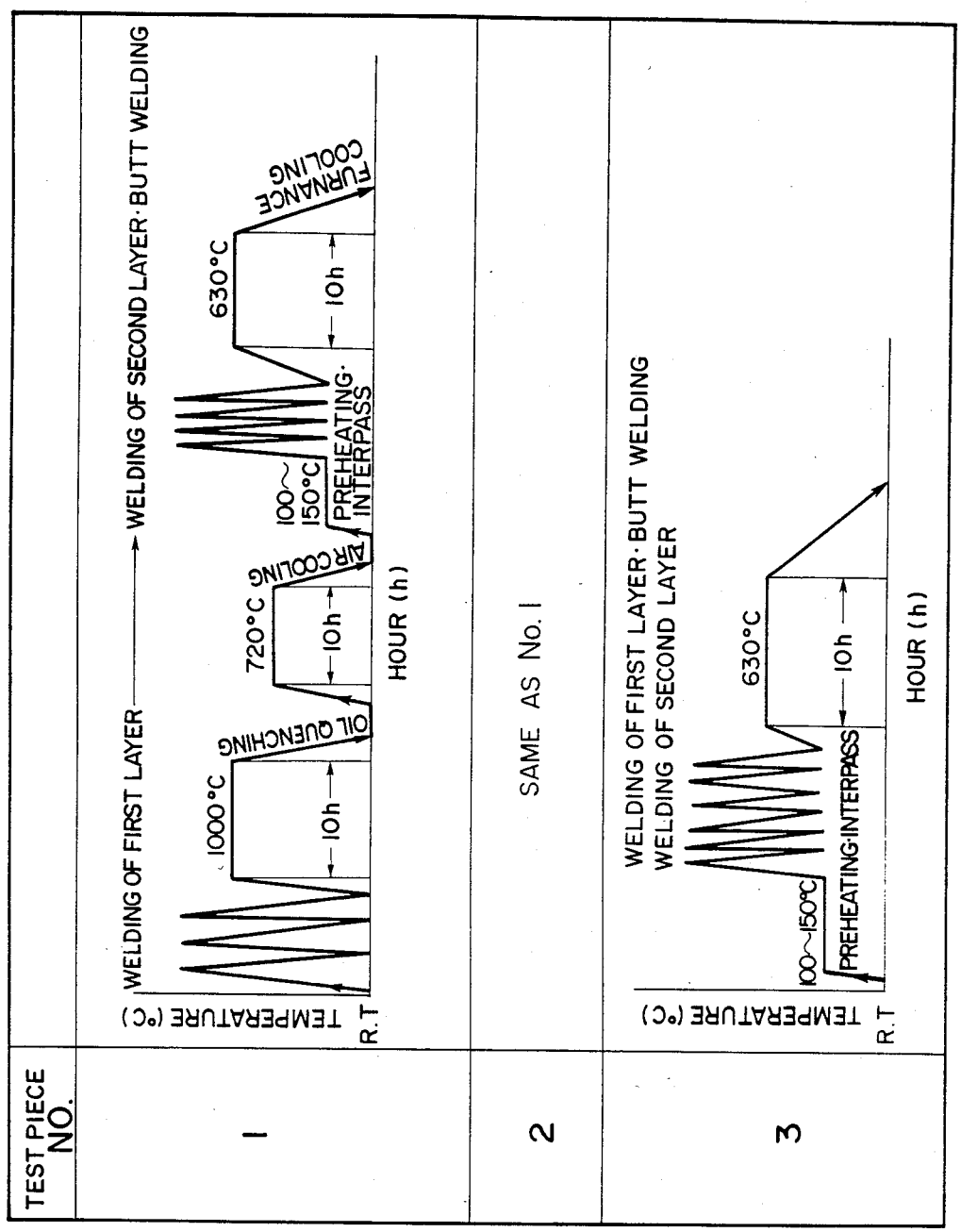
FIG. 6 is a graph showing the steps of welding treatment.

FIG. 6 shows the conditions under which welding was performed in the embodiment int he present invention.

Experiments were conducted on the weld zone provided by build-up welding described above.

Figure 5:
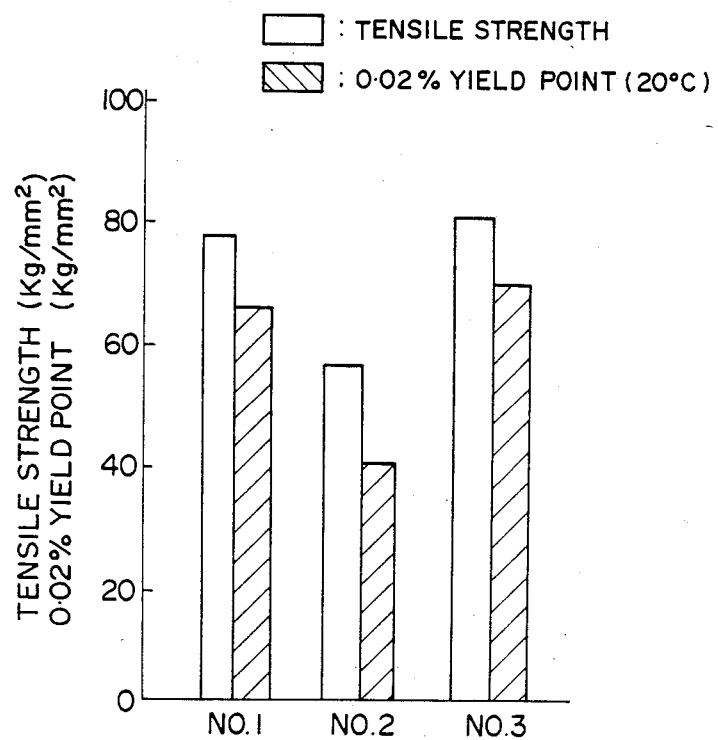
FIG. 5 is a graph showing the mechanical characteristics of a welding portion.

FIG. 5 shows the results of tension tests conducted on the welded joints. Specimen No. 1 according to the invention had a tensile strength of 78 kg/mm$^2$ and a 0.02% yield strength of 67.0 kg/mm$^2$, indicating that it has excellent mechanical strength characteristics. The position of the rupture of the specimen was in the second layer of build-up welding.

Specimen No. 2 had a tensile strength of 57 kg/mm$^2$ and a 0.02% yield strength of 41 kg/mm$^2$. From these data, it is seen that the conventional weld zone of the build-up welding performed by use of the prior art low Cr steel alloy poses a problem with regard to the strength of the welded joint.

Specimen No. 3 was provided by the double layers type build-up welding method according to the invention while being subjected to a heat treatment different than that of Specimen No. 1. It will be seen that Specimen No. 3 shows substantially the same excellent strength characteristics as Specimen No. 1 according to the invention. The rupture position of Specimen No. 3 was in the second layer of build-up welding.

Table 4 shows the results of measurements of residual stress in the vicinity of the boundary between the deposited metal and the base metal.

TABLE 4

| No. | Maximum Residual Stress (kg/mm$^2$) |
|-----|-------------------------------------|
| 1   | +3.8                                |
| 2   | +4.5                                |
| 3   | +28.0                               |

It will be seen that the maximum values of residual stress of Specimens Nos. 1 and 2 are very low levels that is not more than 4.5 kg/cm$^2$. Meanwhile Specimen No. 3 had a substantially higher maximum residual stress, 28 kg/mm$^2$, than those of Specimens Nos. 1 and 2. The low values in Specimen Nos. 1 and 2 are obtained because of the welding conditions of the present invention. That is, in each of Specimen Nos. 1 and 2, the weld zone obtained after the first layer of the build-up welding is effected is subjected to heat treatment at about 1000° C. and then is subjected to another heat treatment at about 700° C. On the other hand, the residual stress of Specimen No. 3 was not reduced because it was not subjected to such specific heat treatment.

In the welding process performed for providing Specimen No. 3, it would be possible to reduce residual stress by applying a mechanical impact such as peening, to a bead for each pass. Such method would require an extremely high number of additional operation steps as compared with the method of obtaining Specimen No. 1. It will therefore be apparent that the method for Specimen No. 1 is superior to that for Specimen No. 3.

It is to be understood that the welding rod used in the invention may have other compositions slightly different from those shown and described hereinabove, and that any other elements may be added to the compositions if such additions contribute to obtaining an improved weld zone.

EXAMPLE 2

Figure 7:
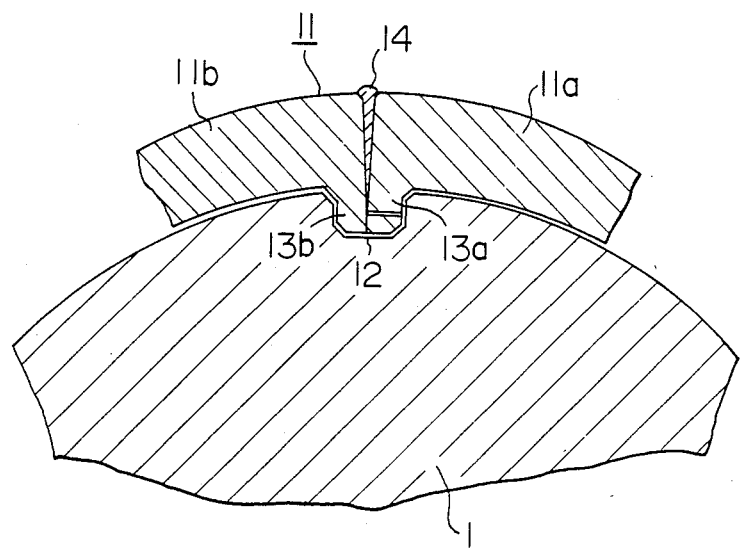
FIG. 7 is a sectional view of a journal portion having a welded sleeve fitted around the journal portion.

Referring now to FIG. 7 which is a sectional view of the journal portion of a rotor 1 having a welded sleeve 11 fitted around the journal portion, the projections 13, 13 on the back side of the bevels of joint surfaces of the sleeve segments are adapted to be received by grooves 12 formed in the journal surface as in the case the embodiment shown in FIG. 1. After fitting the projections 13, 13 of the sleeve segments 11a, 11b in the grooves 12 of the rotor, the sleeve segments 11a, 11b are welded to each other by means of a beam of a high energy density. Namely, the weld 14 shown in FIG. 7 is formed by an electron beam welding. According to this method, it is possible to concentrate any defect in the weld bead to the portion around the projections 13, 13 to where no circumferential stress is applied, so that the sleeve 11 thus formed can be used as it is, without necessitating troublesome work for eliminating any weld defect which tends to appear in the weld part of the sleeve due to insufficient penetration. The projections 13, 13 are effective also in preventing the weld bead from reaching the rotor surface.

A forged austenite steel is used as the material of the rotor shaft, which is aged after the solution treatment thereof.

The sleeve 11 is made of a forged steel consisting essentially, by weight, of 0.12–0.18% C, 0.15–0.35% Si, 0.3–0.6% Mn, 4–4.5% Ni, 0.7–1.0% Cr, 0.15–0.30% Mo, and the balance substantially Fe, which steel alloy is conditioned such that, at a room temperature, the tensile strength is not less than 70 kg/mm$^2$, the yield strength being not less than 60 kg/mm$^2$, the elongation being not less than 16%, the reduction of area being not less than 45% and the Vickers hardness value being not less than 290.

The sleeve is formed of a plurality of divided sleeve segments, which segments were welded at a small diameter portion in the journal portion. After the welding operation of the sleeve segments so as to form the sleeve, stress-relief annealing was effect at about 600° C. and then the inner surface thereof was worked. The resultant sleeve was heated to a temperature of 250°–300° C. and then was secured to a predetermined position in the journal portion by shrinkage fit. After the shrinkage fit, the outer periphery of the sleeve was mechanically worked. The sleeve had a whole bainite structure. As the results of abrasion tests thereof, it was found that the rotor shaft of the present invention having the welded sleeve is superior in wear resisting properties to that of austenitic steel.

The low alloy steel is preferably used as the material of the layer 5 of build-up welding because of the following reasons. Namely, the low alloy steel has a heat conductivity which is about 30% higher than that of the Cr-Ni austenitic steel used as the material of the rotor, so that the layer 5 of build-up welding exhibits a small temperature rise during the rotation of the rotor. As a consequence, the tendency of seizure between the layer 5 and the bearing 4 due to the temperature rise caused by friction is suppressed advantageously.

This advantage has been confirmed also through an experiment. The experiment was conducted using a rotor made of the austenitic steel and a rotor of the same material as the layer, i.e. a low alloy steel containing Cr, Mo and V. These rotors were rotatably supported at their journal portions by bearings and rotated at a predetermined speed, while supplying a lubrication oil to the bearings. Fine particles of foreign matters were added to the lubrication oil, and the extent of damage of the journal portions due to the presence of the foreign matters was examined.

The roughnesses of the journal surfaces of the rotors made of the austenitic steel and the low alloy steel containing Cr, Mo and V, respectively, were observed after lapse of a predetermined time from the commencement of addition of the foreign matter particles to the lubrication oil, with the result that the surface roughness of the low alloy steel was smaller than that of the austenitic steel. That is, the low alloy steel exhibited superior wear resistance to the austenitic steel.

The invention has been described regarding the case of build-up welding and another case that a sleeve of high bearing characteristics is secured to the bearing portion of the rotor shaft which sleeve is obtained by using a plurality of semi-circular members, which are joined by welding to the cylindrical shape of the sleeve at the small diameter portion of the rotor shaft and secured in place by shrinkage fit to a predetermined position. The sleeve may be formed of the aforesaid steel alloy containing 0.3–3.0% Cr which is quenched and tempered. After being welded, the sleeve may be preferably subjected to SR treatment.

From the foregoing description, it will be appreciated that the present invention provides a steam turbine rotor shaft suitable for use at high temperature including a journal section of high strength, low residual stress and excellent bearing characteristics.

We claim:

1. A steam turbine rotor shaft comprising a shaft formed of forged and precipitation-hardened austenite steel consisting essentially, by weight, of 0.01–0.10% C, not more than 1.0% Si, not more than 2.0% Mn, 12–16% Cr, 24–27% Ni, 0.5–1.5% Mo, 1–2.5% Ti, 0.2–0.4% Al, 0.1–0.4% V and the balance substantially Fe, said austenite steel having as a whole austenite structure having a γ' phase precipitated therein, and a metal member of better bearing characteristics than such forged austenite steel provided on an outer surface of a bearing portion of a journal section of said shaft, said metal member comprising a plurality of layers of build-up welding applied directly to said shaft including a first layer formed by use of a welding rod of a Ni base alloy consisting essentially, by weight, of 0.01–0.1% C, 0.5–3.5% Mn, 0.2–1.0% Si, 0.2–1.0% Cu, 60–75% Ni, 0.2–1.0% Al, 1.5–3.0% Ti, 10–20% Cr, 0.5–1.5% Nb and the balance substantially Fe, while a second layer and succeeding layers are formed by use of welding rods of low alloy steel consisting essentially, by weight, of not more than 0.1% C, not more than 1.0% Si, not more than 2.0% Mn, 0.3–3.0% Cr, nor more than 2.0% Mo and the balance substantially Fe such that a surface of said metal member to be in contact with a bearing is formed of low alloy steel containing Cr of 0.3–3.0 weight percent.

2. A steam turbine rotor shaft as claimed in claim 1, wherein a weld zone obtained after the first layer is provided is held at a temperature between 900° and 1100° C. and then quenched, said weld zone being then subjected to another heat treatment at a temperature between 650° and 750° C., said second and succeeding layers being thereafter provided and then being subjected to annealing at a temperature between 550° and 680° C. to relieve residual stress after the final layer thereof is provided.

* * * * *